United States Patent [19]

O'Neil

[11] Patent Number: 4,556,116
[45] Date of Patent: Dec. 3, 1985

[54] FAIL-SAFE MECHANISM FOR AN ELECTRICAL POWER ASSISTED STEERING SYSTEM

[75] Inventor: Walter K. O'Neil, Birmingham, Mich.

[73] Assignee: Eaton Corporation, Cleveland, Ohio

[21] Appl. No.: 646,368

[22] Filed: Aug. 30, 1984

[51] Int. Cl.$^4$ ............................................. B62D 5/00
[52] U.S. Cl. .................................... 180/79.1; 180/142
[58] Field of Search ....................... 180/79.1, 133, 142

[56] References Cited

U.S. PATENT DOCUMENTS

| 1,144,552 | 6/1915 | Lardner et al. | 180/79.1 |
| 2,551,742 | 5/1951 | Huebner, Jr. et al. | 180/79.1 |
| 2,925,741 | 2/1960 | Winkelmann | 180/79.1 |
| 4,173,265 | 11/1979 | Kremer | 180/79.1 |
| 4,356,732 | 11/1982 | Hachtel et al. | 73/862.33 |

FOREIGN PATENT DOCUMENTS 2242009  4/1975  France ............................... 180/79.1

*Primary Examiner*—Magdalen Y. C. Moy
*Attorney, Agent, or Firm*—Krass & Young

[57] ABSTRACT

In a power assisted steering system for a vehicle, an operator controlled steering shaft is connected directly to at least one steered wheel of the vehicle. An electric motor is connected to the steering shaft via a ratio reduction means. A clutch is interposed between the motor and the ratio reduction means to connect and disconnect the motor from the steering shaft. A control circuit senses torque and direction of rotation of the steering shaft by the operator and operates the motor to provide power steering assistance. The control circuit also monitors the operation of the system and, when the system is operating properly, keeps the clutch in engagement to transmit torque from the motor to the steering shaft. When the system is diagnosed to be operating improperly, the clutch is rapidly disengaged and the motor is effectively isolated from the steering shaft.

6 Claims, 4 Drawing Figures

FAIL-SAFE MECHANISM FOR AN ELECTRICAL POWER ASSISTED STEERING SYSTEM

TECHNICAL FIELD

This invention relates to electrical power steering systems and, more particuarly, to a fail-safe clutch mechanism for use with an electrical power steering system which disconnects the steering system from the electric power assist motor when the control circuitry fails to operate properly.

BACKGROUND OF THE INVENTION

It is well-known in the art to use electric motors to provide power assisted steering in motor vehicles. Typically, these power steering systems include a conventional multi-axis gear reduction box between the motor and the steering shaft to raise the torque applied by the motor to the shaft.

When these systems are functioning properly, the motor, in response to the signals from a control circuit, operates to assist the driver of the vehicle by turning the steering shaft via the gear reduction box in the same direction and at the same speed at which the driver turns the steering wheel while boosting his input torque by a factor that can be chosen during design.

However, power assisted steering systems occasionally malfunction. As a result, the motor may either cease to operate entirely or it may operate eratically or continuously, because of malfunctions of the control circuit. When the motor fails to operate entirely, the driver must steer the vehicle without power assistance and, in addition, part of the effort required to turn the steering wheel is absorbed by the motor inertia since, even though it is idle, it remains coupled to the steering shaft.

The second type of failure can be more troublesome. Since the power assist motor may be more powerful than the driver, when the motor fails to respond properly to the driver's commands, the possibility exists that the motor will control the operation of the steered wheels regardless of the driver's actions. In these instances, the driver may lose steering control over the vehicle.

SUMMARY OF THE INVENTION

The difficulties encountered in the prior art are overcome by the power steering system of the present invention. The power steering system provides for fail-safe operation of a bidirectional electric motor which is used to give power assist to the steering mechanism on a motor vehicle. The motor is coupled to a steering shaft by a ratio reduction means which increases the torque output from the motor by a predetermined amount. A sensor and control circuit are used to energize the motor in response to steering commands from the driver delivered via the steering mechanism. Means are provided to isolate the motor from the steering shaft whenever the control circuit fails to operate properly. In the preferred embodiment disclosed, the isolation means takes the form of a clutch mechanism, connected between the motor and the ratio reduction means, which connects and disconnects the motor to and from the steering shaft. When the clutch is engaged, the motor is connected to the steering shaft through the ratio reduction means and provides power assisted steering to the operator of the vehicle. Preferably, the clutch is engaged only when a signal from the control circuit indicates that everything is operating properly. In the absence of such a signal from the control circuit, the clutch disengages and the motor is effectively isolated from the steering shaft. This system provides for safe operation of the vehicle steering mechanism under all conditions since, whenever the motor operates improperly, it is disconnected from the steering shaft and manual steering of the vehicle takes place without interference of the motor.

The ratio reduction means takes the form of a conventional multi-axis planetary gear system including a hollow sun gear connected to the motor, planetary gears in mesh with the sun gear, and a ring gear surrounding and in mesh with the planetary gears. L-shaped planet carriers connect the planetary gears to the steering shaft so that movement of the planetary gears around the circumference of the sun gear turns the steering shaft. The clutch mechanism is connected to the housing of the gear box and is normally biased away from the ring gear by a spring. When the clutch is disengaged, the ring gear, planetary gears and sun gear are free to rotate independently of the planet carrier. Thus, torque from the motor which turns the sun gear does not resut in movement of the planet carrier and no torque is imparted to the steering shaft while the clutch is disengaged.

The control circuit and the sensor cooperate to drive the motor in the direction and at the speed the steering wheel is turned by the operator. The control circuit also monitors the operation of the motor and determines whether the motor is responding properly. If so, an energization signal is sent to the clutch. Upon receiving a signal from the control circuits, the clutch engages by making contact with the ring gear and preventing it from rotating freely. Upon engagement of the clutch, torque from the motor is transferred to the sun gear and in turn to the planetary gears, and provides power assist to the steering shaft to help steer the vehicle.

The steering shaft extends through the center of both the ratio reduction means and the electric motor, making a direct connection to the steered wheels of the vehicle. Thus, when the clutch disengages, the driver remains in direct control over the wheels of the vehicle.

DETAILED DESCRIPTION OF THE ILLUSTRATIVE EMBODIMENT

Figure 1:
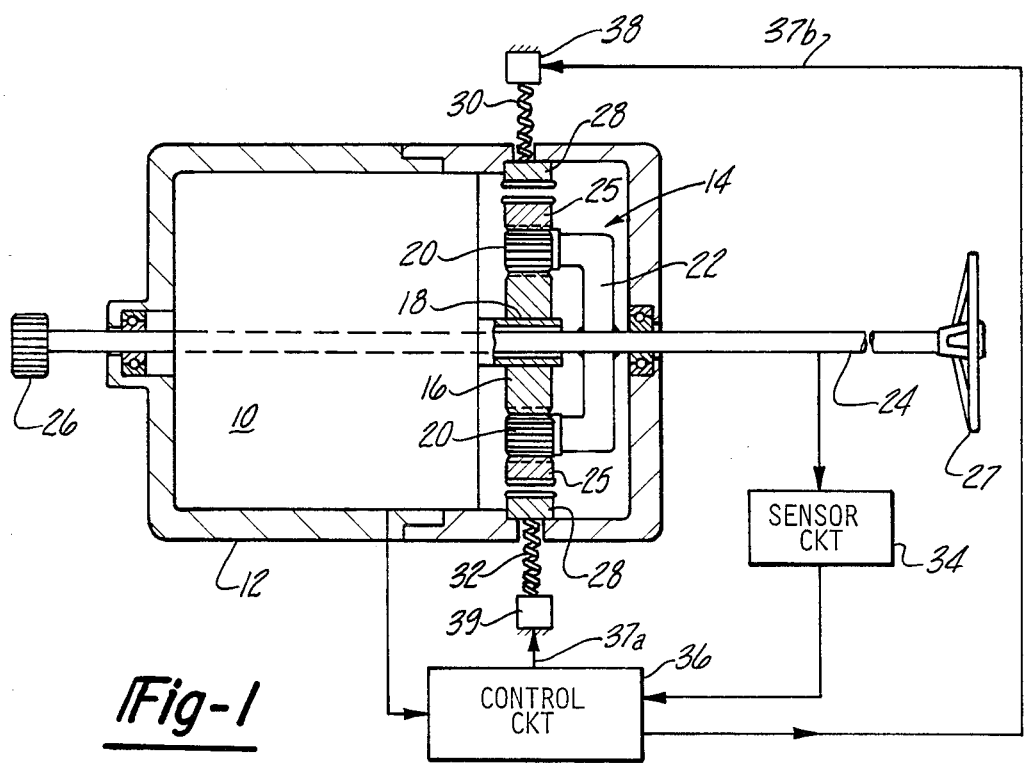
FIG. 1 is a cross-sectional view illustrating a first embodiment of the present invention.

A first embodiment of the power steering system of the present invention is illustrated in FIG. 1. A hollow rotor shaft electric motor 10 for providing power assist to a steering mechanism 27 is enclosed within a housing 12. Also enclosed within the housing is a ratio reduction means shown generally at 14. The ratio reduction means is preferably in the form of a multi-axes gear reduction unit such as a planetary gear system. In this system, a hollow sun gear 16 is axially coupled to the rotor of the electric motor 10 by a hollow motor shaft 18. Circumferentially spaced about and in mesh with the sun gear 16 are two or more planet gears 20. The planet gears are coupled, via an L-shaped planet carrier 22, to the steering shaft 24 which directly connects the vehicle's steering mechanism 27 and the wheels of the vehicle (not shown). The steering shaft 24 extends from the steering mechanism 27 through the center of sun gear 16 and motor 10 and ends in a pinion 26 which is part of a rack and pinion mechanism which controls the steered wheels of the vehicle. Completing the planetary gear system is a ring gear 25 which surrounds and is in mesh with the planet gears 20. Surrounding the planetary gear system assembly 14, is a clutch mechanism 28. The clutch mechanism is mechanically grounded to the housing 12 and biased radially away from the ring gear 25 by springs 30 and 32.

A sensor circuit 34 is connected to the steering shaft 24 to sense rotation of the shaft by the operator of the vehicle. The sensor 34 may be of a type well-known in the art, such as the sensors disclosed in U.S. Pat. No. 4,173,265 (Kremer) and U.S. Pat. No. 4,356,732 (Hachtel et al.). However, sensor 34 is preferably of the type disclosed in U.S. Patent Application Ser. No. 520,358 filed 8/4/83 assigned to the same assignee as the present invention. These sensors generate signals corresponding to the direction and amount of driver input torque to the steering shaft. In the present invention, sensor 34 delivers these signals to a control circuit 36.

Figure 4:
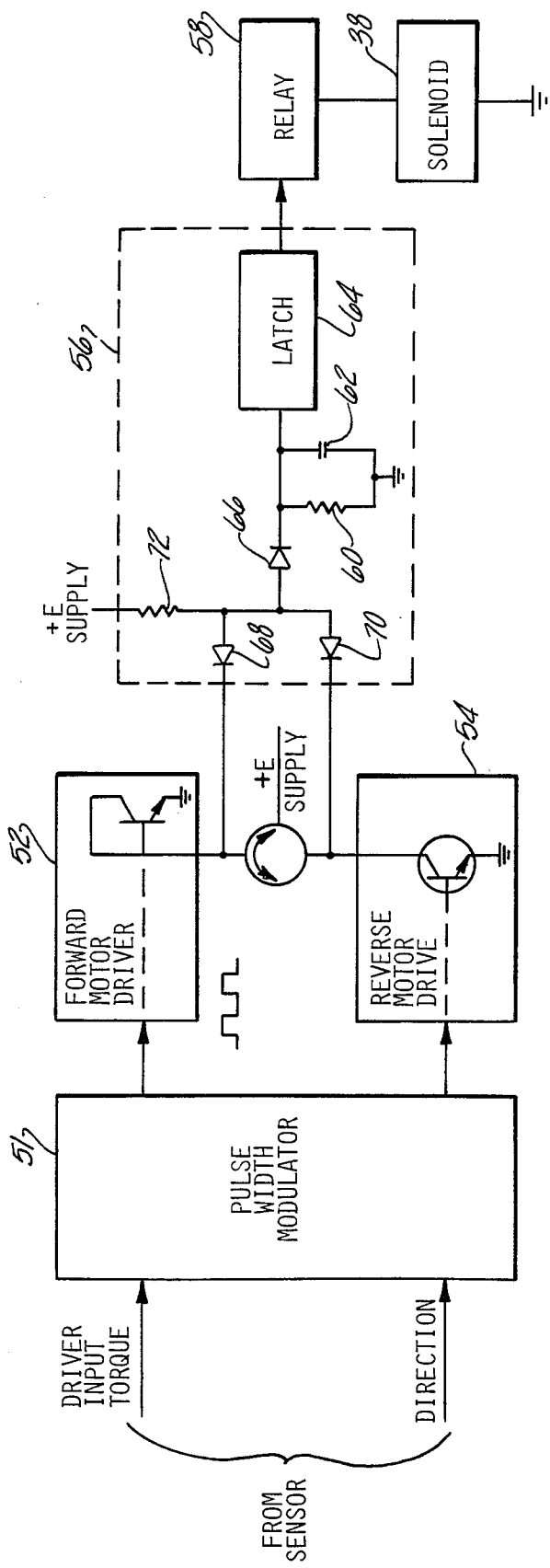
FIG. 4 is a block diagram of a control circuit illustrated in FIGS. 1 and 2.

A control circuit of the type which may be used in conjunction with the present invention is illustrated in a block diagram in FIG. 4. Torque and direction inputs from the sensor 34, the circuitry for which may be physically located on the same electronic printed circuit board as that the control circuit, after processing are fed into a conventional pulse width modulator 51. The pulse width modulator 51 generates a pulse signal whose width varies in proportion to the torque input from the sensor 34. The pulse width modulated signal are delivered either to a conventional forward motor drive circuit 52 or a conventional reverse motor drive circuit 54, depending on the direction input from the sensor 34. The drive circuits 52 and 54, typically having power transistor switches, operate to drive the motor 10 in the forward or reverse direction and provide torque proportional to the width of the pulse width modulated signals.

A diagnostic circuit 56 also receives the drive signals from circuits 52 and 54. The diagnostic circuit 56 generates an energization signal to relay 58 when the drive circuits 52 and 54 are properly driving motor 10. The relay 58, when the energization signal is present, electrically connects the solenoid 38 to a voltage source thereby energizing the solenoid. In the event the drive circuits 52 and 54 are not properly driving the motor 10, the energization signal is not generated by the diagnostic circuit 56 and relay 58 opens disconnecting solenoid 38 from the voltage source.

The diagnostic circuit 56 may comprise, for example, a capacitor 62 in parallel with a relatively high impedance resistor 60. In this combination, the capacitor charges positively very quickly through diode rectifier 66 and 70 and resistor 72 when the drive circuits 52 and 54 are not driving motor 10, i.e. during the high voltage portions of the pulse width modulated signal. When the pulse voltage goes low, the drive circuits 52 and 54 drive the motor, removing the voltage source via resistor 72 from the diagnostic circuit 56 by means of diode rectifier 68 or 70. Thus, capacitor 62 discharges slowly through resistor 60. The voltage on capacitor 62 is delivered through a latch 64 and becomes the energization signal delivered to energized solenoid 38. When the voltage on capacitor 62 is above a predetermined threshold, as is normally the case during operation of the electrical power steering system, the energization signal is present.

The pulse width modulator 51 is designed so that it generates, at most, a 90% duty cycle low when the motor 10 is to be driven for maximum output. This means that, under conditions of proper maximum operation, a pulse is generated with a low voltage during 90% of the cycle and high voltage during 10% of the cycle. The values for the resistor 60 and capacitor 62 are chosen so that the capacitor 62 will not discharge below the predetermined threshold voltage when the pulse width modulated signal is at 90% duty cycle. With this choice of values, the energization signal will be present as long as the duty cycle remains at or below 90%, i.e. as long as the motor 10 operates at or below its desired maximum output. However, if the duty cycle becomes greater than 90% low, such as would occur with a malfunction in the pulse width modulator 51, or with a failed traansistor drive switch or a shorted motor lead, capacitor 62 will discharge below its threshold voltage because the drive circuits are not off long enough to recharge the capacitor 62 after it discharges. This effectively removes the energization signal at the output of diagnostic circuit 56. Preferably, the latch 64 is connected to the output of the capacitor 62 so that its output remains low once the capacitor voltage drops below the threshold voltage. Thus, if the motor fails to operate properly, due to improper operation of the control circuit, the voltage on capacitor 62 will drop below the threshold removing the energization signal. It is understood, of course, that other types of diagnostic circuits and control circuits may be used to drive and monitor motor 10 and are adaptable for use with the present invention.

Referring again to FIG. 1, as described above, the control circuit 36 controls the torque and direction of rotation of the electric motor and receives diagnostic feedback on the motor's operational state. When the motor is operating properly, a signal is sent from the control circuit 36, on outputs 37a and 37b, to solenoids 38 and 39. In response, the solenoids act upon housing 12 to counteract the bias of springs 30 and 32 moving the housing 12 towards the ring gear 25 engaging the clutch 28 through frictional contact between the clutch 28 and ring gear 25. When the clutch 28 is engaged, the ring gear 25 is held stationary with respect to the housing 12 and clutch 28. Consequently, torque applied to the sun gear 16 by the motor 10 produces a corresponding movement of the planet gears 20 around the circumference of the sun gear 16. Movement of the planet gears turns the steering shaft 24 via planet carriers 22.

When the control circuit 36 detects improper operation of the motor 10, the energization signal to the solenoids 38 and 39 is terminated. The absence of this signal causes the solenoids to release allowing the normal biasing force of springs 30 and 32 to disengage the clutch 28 from the ring gear 25. With the clutch disengaged, the right gear 25 rotates freely about planet gears 10. As a result, any torque imparted to sun gear 16 by the motor 10 serves only to spin ring gear 35 about its axis. Planet gears 20 do not revolve around sun gear 16 and no torque is imparted via planet carrier 22 to the steering shaft 24. consequently, when the motor fails to operate properly, the clutch 28 is disengaged and the motor 10 is effectively isolated from the steering shaft 24. However, steering control of the vehicle is not lost since the steering shaft 24 is connected directly to rack and pinion 26 giving the operator manual control over the steering of the vehicle.

Figure 2:
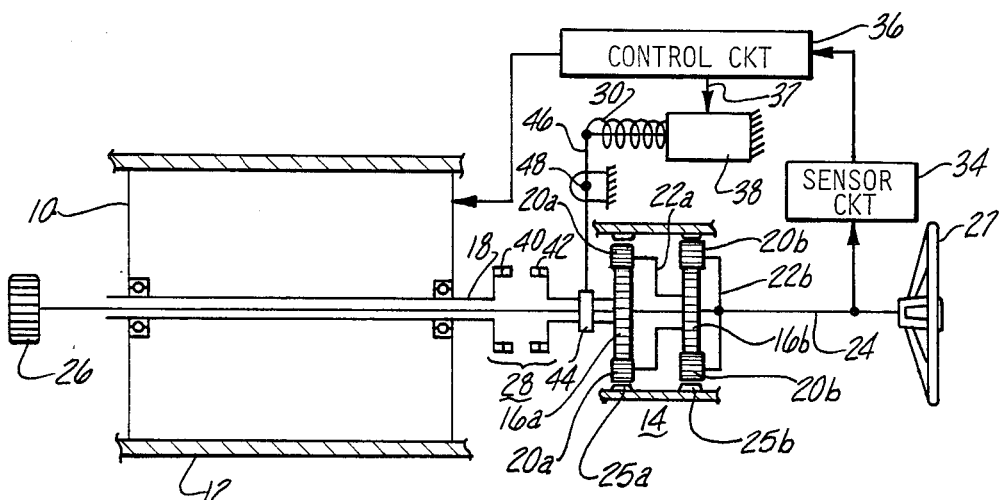
FIG. 2 is a cross-sectional view illustrating the second embodiment of the invention; and, FIG. 3 is a cross-sectional view of the clutch mechanism of FIG. 2.

FIG. 2 illustrates a second embodiment of the present invention. As in the first embodiment, a hollow rotor shaft electric motor 10 provides power assist to the power steering shaft 14 under control of control circuit 36. In this embodiment, ratio reduction means 14 comprises a pair of interconnected conventional planetary gear systems. The clutch 28 is connected between the armature shaft 18 of the motor 10 and the sun gear 16a of the first planetary system. The planet gears 20a of the first sun gear system are connected, via L-shaped planet carriers 22a to the sun gear 16b of the second planetary system. The planet gears 20b of the second planetary system are, in turn, connected to the steering shaft 24 via L-shaped planet carriers 22b. The ring gears 25a and 25b of the two planetary systems are mechanically grounded to the housing 12 of the power assist unit. As in the previous embodiment, the motor 10 and the sun gears 16a and 16b are hollow so that the steering shaft 24 may extend axially through the ratio reduction means 14 and the motor 10 to directly engage the steered wheels via rack (not shown) and pinion 26.

The clutch mechanism of FIG. 2 comprises two hollow, coaxial clutch halves 40 and 42. Clutch half 40 is secured to armature shaft 18 of motor 10. Clutch half 42 is integral with a shift collar 44, that is in axially slidable splined connection with the hub of the sun gear 16a for axial movement toward and away from the sun gear. Movement of clutch half 42 is controlled by solenoid 38. One end of a rod 46 is attached to the core of solenoid 38. The other end of the rod 46 is fixed to shift collar 44. Rod 46 is fixed at a point along its length by pin 48. Thus, when the core of solenoid 38 extends or retracts, rod 46 pivots about pin 48 sliding shift collar 44 and clutch half 42 away from or toward sun gear 16a.

Spring 30 on solenoid 38 normally biases the clutch plate 42 toward sun gear 16a. However, upon receipt of the energization signal from control circuit 36, solenoid 38 is activated to slide clutch plate 42 away from sun gear 16a and into mesh with coaxial clutch half 40. p In operation, steering shaft 24, attached to the vehicle's steering wheel 27, is directly connected through axial openings in sun gears 16a and 16b, clutch halves 40 and 42, armature shaft 18, and motor 10 to pinion 26 and steering rack (not shown) to control the movement of the steered wheels. Sensor 34, connected to shaft 24, detects any turning movement of the steering shaft 24 by the driver and transmits a signal to control circuit 36 indicating the direction and applied torque at which the steering shaft is being turned. The control circuit, in turn, energizes motor 10 to turn in the same direction in which the steering shaft 24 is being turned by the driver. The diagnostic circuit 56 (FIG. 4) indicates whether the motor 10 is operating properly. If the motor is operating properly, control circuit 36 sends an energization signal on output 37 to solenoid 38. Core 47 on solenoid 38 is retracted, pivoting rod 46 and sliding clutch half 42 into mesh with the clutch half 40, thereby engaging the clutch 28. Once the clutch is engaged, torque from the motor 10 is transmitted, via armature shaft 18, through the clutch to sun gear 16a of the first planetary system. Sun gear 16a turns in the same direction in which the motor is turning and causes planetary gears 20a and the carrier 22a to revolve about the sun gear in the same direction. The torque from the carrier 22a is transmitted to sun gear 16b causing it to rotate in the same direction in which the motor 10 is turning. As a result, planet gears 20b and the carrier 22b revolves about sun gear 16b. The torque from carrier 22b is transmitted to the steering shaft 24, turning it in the same direction as motor shaft 18 and sungear 16b. Torque from the motor 10 is thereby transmitted through gear reduction means 14 to the steering shaft 24 to provide power assisted steering to the driver.

When the control circuit 36 detects improper operation of the motor 10, the energization signal on output 37 is removed. This deenergizes the solenoid 38 and, because of the biasing effect of spring 30 on rod 46, clutch half 42 slides away from clutch half 40 thereby disengaging the clutch. When the clutch 28 is disengaged, torque from the motor 10 is no longer transmitted through the clutch to sun gear 16a. Thus, the motor is effectively isolated from the steering shaft 24 and its failure to operate properly does not affect the steering of the vehicle.

Figure 3:
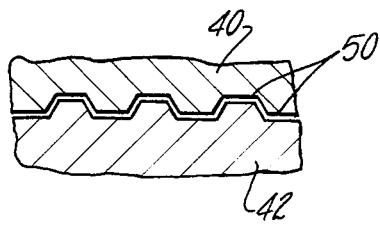

The face of clutch halves 40 and 42 is illustrated in detail in FIG. 3. As shown, each clutch face includes a set of angled teeth 50 which interlock when the clutch is engaged. The angling of the teeth serves two purposes. First, the angle of the teeth causes a face opposing the solenoid holding the clutch engaged, when the solenoid is de-energized the face assists in disengaging the clutch rapidly.

Second, the angled teeth act as a torque limiter. When the torque on the clutch is excessively high, the angle of the teeth permits the clutch faces to to disengage monentarily, preventing the excess torque from being transmitted to the steering shaft 24 or to the motor 10. Thus, for example, if the motor 10 abruptly generates a high torque, the clutch faces 40 and 42 will ratchet and the torque will not be tranmitted via the steering shaft 24 to the wheels or to the steering wheel of the vehicle. Similarly, if the wheels of the vehicle are abruptly turned, such as when the wheels hit a curb, an excessive torque will not be applied to the ratio reduction means 14 in the reverse direction. Instead, the clutch faces 40 and 42 will ratchet, preventing the generation of such torques, whose magnitude would otherwise be proportional to the square of the speed-up gear ratio.

It is understood that the invention is disclosed with reference to specific embodiments which provide the features and advantages previously described. Other embodiments, or modifications to the embodiments shown and described herein, will be apparent to those skilled in the art and are intended to come within the spirit and scope of the following claims.

I claim:

1. A power assisted steering system for a vehicle, the vehicle having an operator controlled steering mechanism, at least one steered wheel and a steering shaft directly connecting the steering mechanism to the wheel, the system comprising:
   a bidirectional electric motor;
   control means for energizing the motor to turn in a first direction when the steering mechanism is moved in one direction by the operator, for energizing the motor to turn in a direction opposite said first direction when the steering mechanism is moved in a direction opposite said one direction by the operator, for monitoring the operational condition of the system to detect malfunctions, and for generating a signal indicative of the operational condition system;

clutch means, responsive to the control means for coupling the motor to the steering shaft when the system is operating properly, and for isolating the motor from the steering shaft when the system is not operating properly; and a ratio reduction means connected betwen the motor and the steering shaft for increasing the torque delivered to the steering shaft by the motor, the ratio reduction means including a planetary gear system comprising a sun gear, a plurality of planet gears in circumferential mesh with the sun gear, a ring gear surrounding and in mesh with the planet gears, and planet carriers connecting the planet gears to the steering shaft so that revolution of the planet gears about the sun gear produces a corresponding rotation of the steering shaft.

2. The power assisted steering system of claim 1 wherein the clutch means includes a clutch pad mechanically grounded relative to the rotational movement of the sun gear, the planet gears and the ring gear, said clutch pad being biased radially away from the ring gear; and wherein the clutch means further includes means for radially displacing the clutch pad toward and into frictional contact with the ring gear when the system is operating properly.

3. A power assisted steering system for a vehicle comprising:

a bidirectional electric motor having an axially centered, hollow armature shaft;

at least one planetary gear ratio reduction system including a hollow sun gear axially connected to the armature shaft, planet gears in circumferential mesh with the sun gear, and a ring gear surrounding the planet gears and in circumferential mesh therewith;

an operator controlled steering shaft, connected to at least one wheel of the vehicle, extending axially through the sun gear and the armature shaft, the steering shaft operable to turn the wheel under the control of the operator;

planet carriers connected between the planet gears and the steering shaft so that movement of the planet gears around the circumference of the sun gear produces a corresponding rotation of the steering shaft;

a control circuit including a sensor for sensing the rotational movement and input torque to the steering shaft by the operator and means for controlling the operation of the motor in response to the sensor so that the motor generates torque proportional to the input torque to the steering shaft, the control circuit further including means to detect proper operation of the system and to generate an energization signal when the system is operating properly; and a clutch connected to the planetary gear system, including means responsive to the energization signal such that, when the energization signal is present, said means operates to engage the clutch so that torque from the motor is transmitted through the planetary gear system and to the steering shaft thereby providing power assisted steering and, when the energization signal is not present, said means operates to disengage the clutch so that the motor is effectively isolated from the steering shaft.

4. The power assisted steering system of claim 3 wherein the clutch is mechanically grounded relative to the rotational movement of the ring gear and biased radially away therefrom, said ring gear being free to rotate about its axis while the clutch is disengaged, said clutch, upon operation of said means responsive to the energization signal, moving radially into circumferential frictional contact with the ring gear thereby preventing the ring gear from rotating about its axis.

5. The power assisted steering system of claim 3 wherein the means responsive to the energization signal is a solenoid which includes a spring to bias the clutch into its disengaged state when the energization signal is not present.

6. A power assisted steering system for a vehicle, the vehicle having an operator controlled steering wheel, at least one steerable wheel, and a steering shaft directly connecting the steering wheel to the steerable wheel, the system comprising:

a bidirectional electric motor;

a multi-axis gear reduction unit coupled to the steering shaft so that rotation of the gears of the reduction unit produce a corresponding rotation of the steering shaft, the reduction unit mounted for rotation independent from the rotation of the motor;

a sensor for detecting input torque and direction of rotation of the operator controlled steering wheel;

control means responsive to the sensor, for energizing the motor to turn in the direction in which the steering wheel is turned; and providing torque proportional to the operaator's input, for monitoring the operational condition of the system, and for generating an energization signal when the system is operating properly; and a mechanically grounded clutch, responsive to the energization signal, biased away from the reduction unit and movable into frictional contact with the reduction unit when the energization signal is present to hold the reduction unit in a fixed rotational relationship with the motor.

* * * * *